United States Patent [19]

Smith

[11] 3,928,142

[45] Dec. 23, 1975

[54] CULTURE CHAMBER FOR THE STUDY OF BIOLOGICAL SYSTEMS AND METHOD OF FABRICATION THEREOF

[76] Inventor: Dennis B. Smith, 12016 Rialto St., Sun Valley, Calif. 91352

[22] Filed: July 24, 1973

[21] Appl. No.: 382,164

[52] U.S. Cl. ............... 195/104; 195/109; 195/139; 195/142
[51] Int. Cl.² ........................................... C12B 1/00
[58] Field of Search ........... 195/109, 142, 127, 139, 195/104; 23/292; 277/228, DIG. 6; 285/423, DIG. 20

[56] References Cited
UNITED STATES PATENTS

| | | | |
|---|---|---|---|
| 1,593,325 | 7/1926 | Atwood | 277/DIG. 6 |
| 2,942,520 | 6/1960 | Rose | 195/139 |
| 3,065,669 | 11/1962 | Orsi | 195/139 |

OTHER PUBLICATIONS

Products Engineering "New Silicone Rubber Made in Variety of Shapes" Apr. 1950, p. 166.

Smith "Three Methods for Increasing Sensitivity of Immunodiffusion Reactions" Anal. Biochemistry 22, Mar. 1968, pp. 543–545.

*Primary Examiner*—A. Louis Monacell
*Assistant Examiner*—R. B. Penland
*Attorney, Agent, or Firm*—John T. Matlago

[57] ABSTRACT

A culture chamber for the study of biological systems is formed by cleansing the flat surfaces of a silicone-rubber compound gasket with a reagent such as acetone. The gasket is then placed between similarly cleansed surfaces of two coverglasses. By permitting the culture chamber to set with the surfaces of the gasket in continuous contact with the surfaces of the coverglasses, a natural bond is formed therebetween which strengthens with time.

11 Claims, 20 Drawing Figures

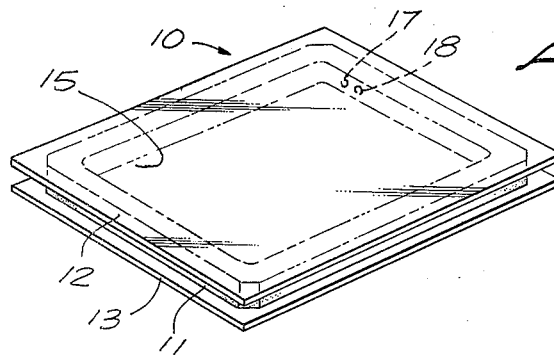
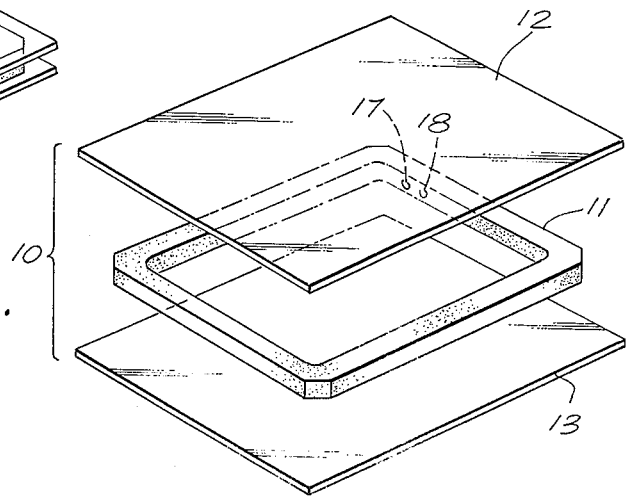
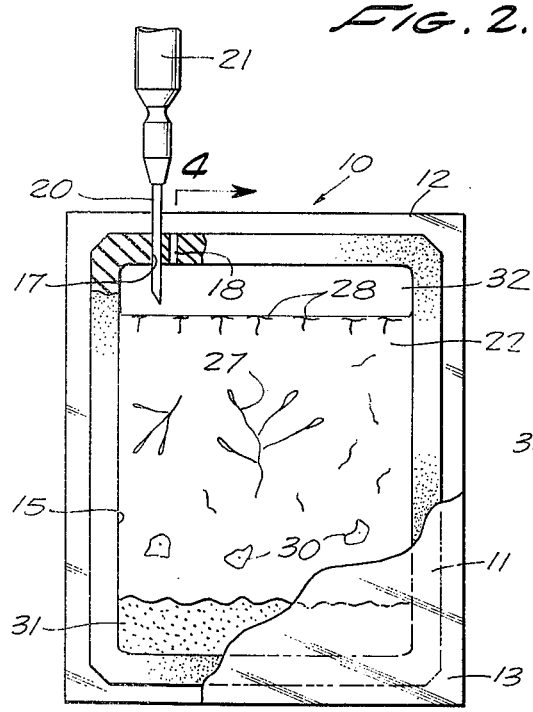
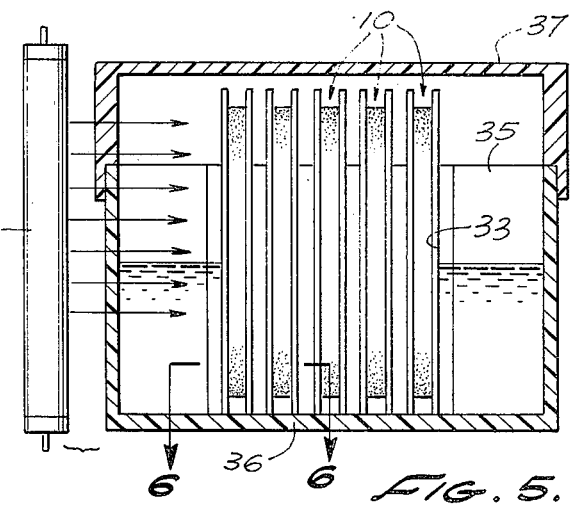
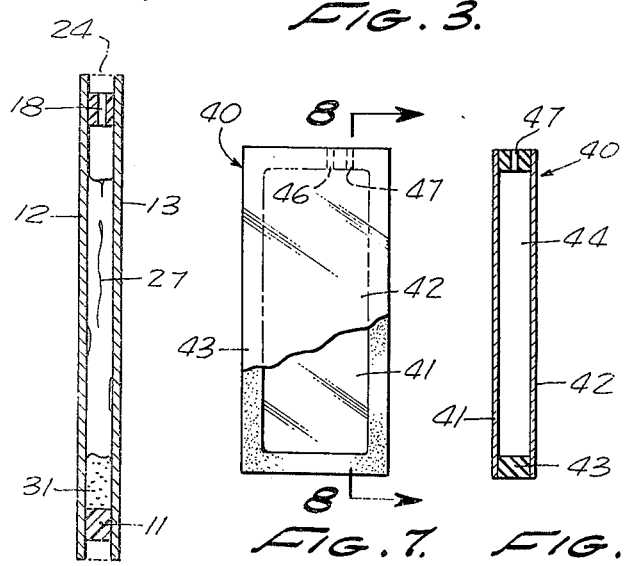
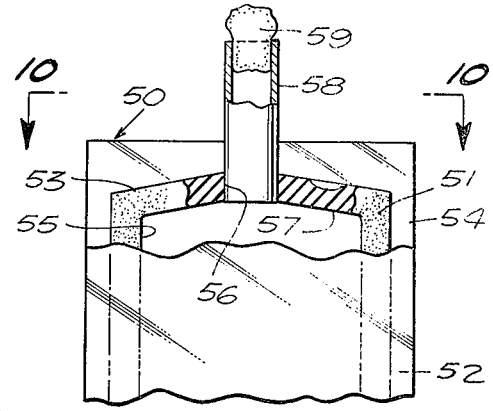

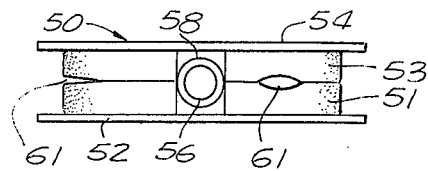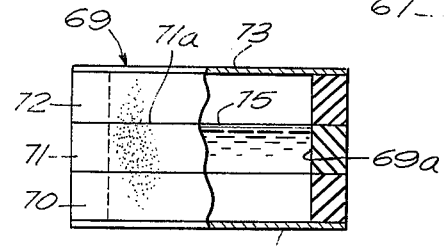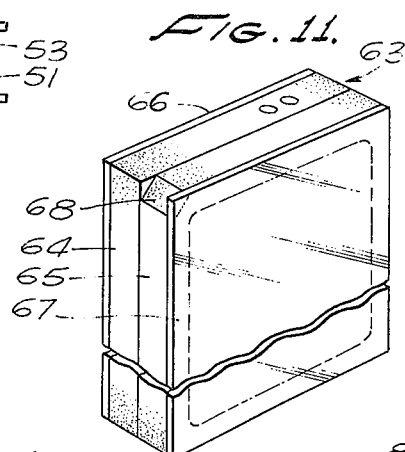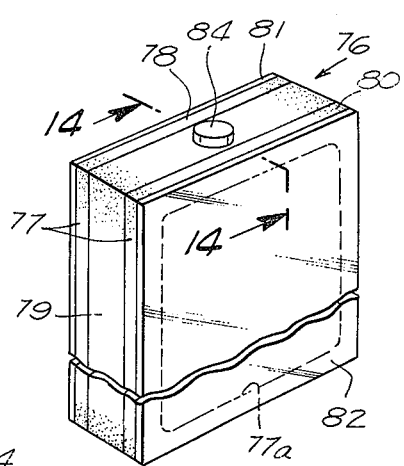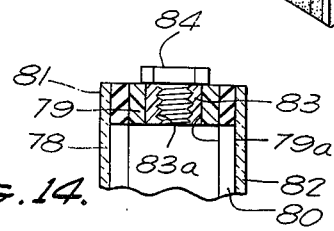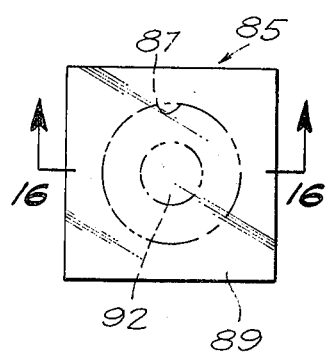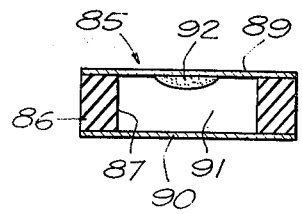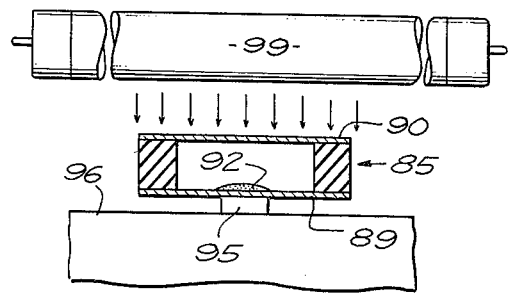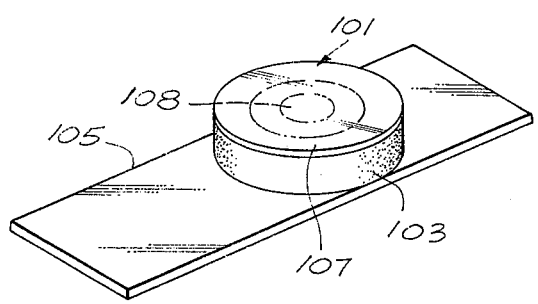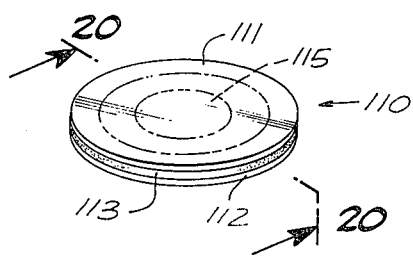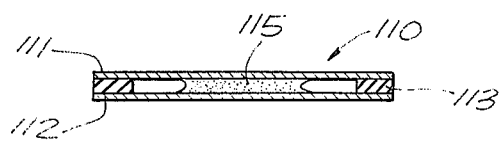

CULTURE CHAMBER FOR THE STUDY OF BIOLOGICAL SYSTEMS AND METHOD OF FABRICATION THEREOF

The present invention relates to culture chambers which are useful in laboratories for the study of ecological and related culture systems and is more particularly concerned with improved structures for such culture chambers and with a method by which they may be inexpensively fabricated.

The concepts of the biological sciences that deal with the relations of organisms and the environment are important subjects being taught increasingly to more and more students. Thus, the large number of students that would benefit by a laboratory experience in this field has created the need for simple, inexpensive, culture chambers for maintaining individualized ecological systems in the laboratory that can be readily viewed in a microscope by the students from time-to-time as the systems develop. By viewing the cultivation of a limited, personal selection of organisms, such as, for example, pond organisms in their niche as provided for by the controlled environment in the culture chambers, the student gains an understanding and familiarity with the individual organisms, as succession progresses, which is highly educational.

Accordingly, one of the objects of the present invention is to provide a culture chamber which permits microscopic examination of any portion thereof without having to alter the culture chamber or disturbing the environment of the organisms being cultured therein.

Another object of the present invention is to provide a culture chamber which enables the cultural development of organisms in the chamber to be continued over long periods of time.

Still another object of the invention is to provide a novel method of inexpensively fabricating a culture chamber.

Still another object of the invention is to provide an improved culture chamber structure which combines both the attributes of a good culture chamber and a good microscopic slide.

Yet another object of the invention is to provide a culture chamber which will last indefinitely, is easy to clean, and easy to handle.

With these and other objects in view, the invention consists of the construction, arrangement, and combination of the various parts of the device whereby the objects contemplated are obtained as hereinafter set forth, pointed out in the appended claims and illustrated in the accompanying drawings.

Referring to the drawings:

FIG. 1 illustrates a culture chamber that has been fabricated in accordance with the present invention;

FIG. 2 is an exploded view of the parts forming the culture chamber of FIG. 1;

FIG. 3 shows the culture chamber of FIG. 1 loaded with an ecological system to be studied;

FIG. 4 is a cross-sectional view of the culture chamber as taken along lines 4—4 of FIG. 3;

FIG. 5 shows a humidifier for storing a plurality of culture chambers in an upright position;

FIG. 6 is a detail taken along lines 6—6 of FIG. 5;

FIG. 7 is a view of a culture chamber especially suited for use with high-magnification, light, microscopes.

FIG. 8 is a cross-sectional view of the culture chamber of FIG. 7 as taken along lines 8—8 thereof;

FIG. 9 is a partial view of a large flasked-type culture chamber;

FIG. 10 is a top view of the culture chamber shown in FIG. 9;

FIG. 11 is a modified embodiment of a culture chamber;

FIG. 12 is a further modified embodiment of a culture chamber;

FIG. 13 is a still further modified embodiment of a culture chamber;

FIG. 14 is a detail taken along lines 14—14 of FIG. 13;

FIG. 15 is a plan view of a drop-culture chamber;

FIG. 16 is a cross-sectional view of the culture chamber of FIG. 15 as taken along lines 16—16 thereof;

FIG. 17 is a view showing the drop-culture chamber of FIG. 15 positioned for storage;

FIG. 18 is a further embodiment of a drop-culture chamber;

FIG. 19 is a perspective view of a wedge-drop culture chamber; and

FIG. 20 is a cross sectional view of the culture chamber of FIG. 19 as taken along lines 20—20 thereof.

Referring to the drawings, the culture chamber 10 shown in FIGS. 1 and 2 includes a rectangularly shaped gasket 11 formed of silicone-rubber compound and a pair of coverglasses in the form of a first and second rectangularly shaped lantern-glass slides 12 and 13. The lantern-glass slides 12 and 13 are preferably of the same size and thickness and when respectively disposed on opposite surfaces of the gasket 11 form a cavity or chamber 15 which is defined by the opposite innerfaces of the glass slides 12 and 13 and the inner peripheral walls of gasket 11. As noted in the embodiment of culture chamber 10 shown in FIGS. 1 and 2, the outer edges of the rectangular glass slides 12 and 13 extend beyond the outer edges of all four sides of the rectangular gasket 11. Two apertures 17 and 18 are formed adjacent to each other on the upper wall of the gasket 11. The apertures provide a communication between the interior of the chamber 15 and the atmosphere surrounding the culture chamber.

The gasket 11 is formed of a silicone-rubber compound whose surfaces have a self-bonding characteristic to glass surfaces, as well as to other silicone-rubber compound surfaces, when these surfaces are formed and treated in the manner to be described hereinafter. The gasket 11 may be die-cut from flat, sheet stock of silicone-rubber compound or may be molded from this material into its final form. The silicone-rubber compound used to make the gasket preferably includes a fine silica filler and the surfaces to be used for bonding should be smooth and flat. The coverglasses are preferably standard, good-quality, optical, glass plates having a high silica content.

In accordance with the present invention, when a silicone-rubber compound is shaped into a gasket 11 having clean, flat, smooth contact surfaces, these surfaces act as bivalent, solid-phase agents for coupling to the clean, flat, smooth, contact surfaces of the coverglasses. Although the nature of the chemical or physical bond responsible for the adhesion of the surface of the silicone-rubber compound gasket to the surface of the coverglasses is not completely understood, it is believed that the strong bond which develops with time is the siloxane bond Si—O—Si resulting from the condensation of water between a silanol group Si—OH on the surface of the glass and a silanol group Si—OH on the surface of the silicone-rubber compound gasket.

In order for this natural bond to form, the surfaces of both the silicone-rubber compound gasket and the coverglasses must be thoroughly cleansed and dried, i.e., free of any foreign substance such as oil, dirt or moisture. An organic reagent which can be effectively used for cleaning the silicone-rubber compound gasket is acetone. After the outside surface of the gasket has been thoroughly cleansed with the acetone to remove any foreign substance that may be phyically adhering thereto, the entire gasket is preferably soaked for several hours in the acetone. The acetone fills the spaces between the silicone polymer and the rubber swells until an equilibrium, called the entropic equilibrium, is obtained. In this way, oils and other unbound substances can be removed from the body of the silicone-rubber compound gasket. After the acetone has evaporated, the gasket returns to its original, flat, configuration. Once the silicone-rubber compound gasket has been treated in this fashion with acetone, and the acetone has had time to evaporate away, ethanol can be effectively used to routinely clean the gasket surface of any particles that would tend to make the surface uneven. Moreover, ethanol can be substituted for the acetone whenever the latter is considered toxic in small amounts to the microorganisms to be cultivated in the culture chamber, and if a delay before assembly after cleaning the gasket with acetone is to be avoided. At times, when the gasket surfaces are very near clean, water can be used for cleaning. However, it takes more time for the water to evaporate.

After the gasket surfaces and coverglass surfaces to be bonded have been cleaned and dried, they merely need be pressed together by the use of moderate finger pressure over a continuous contact area and left in this position to form a natural bond with each other that strengthens with time. Thus, although the initial bond is not strong, after a couple of days the bond is of sufficient strength that often one must sacrifice the coverglass to remove it from the gasket. It should thus be understood that while these silicone-rubber compound bondings do not possess the mechanical strength for withstanding forces for some structural purposes they are more than adequate for forming the types of bonding contemplated for the culture chambers of the present invention. Examples of silicone-rubber compounds that can be used to make the gasket of the present invention may be any of the following sheet stock materials sold by the Kirkhill Rubber Company, Brea, Calif.: BMS No. 1–18; Grade 60; BMR No. 1–59c, Grade 60; and BMS No. 1–45, Grade 50. All of these compound materials, and expecially the latter, have been found to be highly satisfactory in that they are non-toxic to the organisms tested and have all the necessary properties for self-bonding to glass plates referred to herein.

The culture matter may be placed in the culture chamber 10 in either two ways. One way to load the culture chamber is before the last lantern-glass slide 12 or 13 is sealed on the gasket 11. At this time, soil 31, branches of water plants 27, duckweed 28 and/or other large organisms can be placed in the cavity 15 formed by the other lantern-glass slide and the gasket. However, after the last lantern-glass slide has made contact with the gasket and been maintained in position for a few days, it is not easy to remove it for the purpose of adding large objects to the cavity. Thus, after the culture chamber 10 has been formed, the preferred method used to load the chamber 15 is to insert an 18-gauge, hypodermic needle 20 into the aperture 17 provided in the upper wall of the gasket 11. Thus, in this way, pond water 22 in a syringe 21 on the end of the needle 20 can be introduced into the chamber 15. The other aperture 18 serves as a breather aperture during this manner of loading the chamber 15. Then, organisms 30 such as snail eggs, amphipods, or small planarians, for example, can be similarly introduced through the aperture 17 into the chamber 15 by the hypodermic needle 20. An air space 32 is usually left at the top of the chamber 15 to permit a freer exchange of gases. If the culture chamber 10 has been freshly assembled so that the natural bond between the gasket 11 and the glass slides 12 and 13 has not yet had time to strengthen, possible separation of the parts of the culture chamber while loading can be prevented by holding the glass slides 12 and 13 between two heavy plates made of glass or other flat, strong, material.

Inasmuch as silicone-rubber compounds have a differential permeability to gasses, if one desires to experiment with different gas tensions in an ecological system, the breather holes 17 and 18 may be plugged with paraffin 24. If a completely enclosed ecological system is desired, the gasket 13 can be sealed off completely on all four sides thereof with paraffin 24. At other times, it may be desirable to seal off the chamber 15 by allowing only the aperture 17 and 18 to remain open.

After several of the culture chambers 10 have been loaded with desired ecological systems in the manner previously described, these culture chambers 10 may be placed in a plastic container 36 (FIG. 6) and held therein in an upright position by individual slots 33 formed on the opposite side walls 35 thereof. The container 36 is provided with a plastic cover or hood 37. The container 36 may have water in the bottom thereof. Since the walls of gasket 11 will exchange vapor with the ambient atmosphere, it is thus seen that the container 36 serves as a humidifier which insures the fluid in the culture chambers 10 will not evaporate when the culture chambers are left unattended for long periods of time. A fluorescent lamp 38 provided by the Sylvania Company and sold under the tradename, Wide Spectrum GroLux, is located on the side of the container 36. The transparent sides of the container 36 and the alining of the culture chambers 10 within the container 36 permit all the ecological systems within the culture chambers 10 to receive light energy from the same lamp 38. Illuminating the culture chambers in this manner enables the organisms therein to develop quite rapidly.

In accordance with the teachings of the present invention, there are two methods by which a culture chamber may be opened for the purpose of cleansing it for reuse, for example. The method used depends on whether the thick lantern-glass slides are used as coverglasses for the culture chamber or whether the very thin micro-coverglasses necessary for oil-inmersion miscroscopy are used. Thus a thick coverglass like the lantern-glass slide is usually sufficiently strong, if supported on a flat surface, to allow a blade to be inserted between the bonded surfaces without breaking the coverglass. However, if the very thin micro-coverglasses are used or if the thick coverglasses have had a chance to set on the gasket for a long period of time, the preferred method of opening the culture chambers is to soak the entire culture chamber in acetone. The acetone causes the silicone-rubber compound gasket to gradually swell. This loosens the natural bond formed between the surfaces and enables the glass slides to be easily removed by sliding a blade between the glass slide and the gasket. After one or both of the glass slides 12 and 13 have been removed from the gasket 11, the gasket can be used again when the acetone evaporates from the gasket. Overlapping the glass slides 12 and 13 beyond the edge of the gasket 11 facilitates the insertion of the thin, flat, round edged blade or spatula between the gasket and the glass slide for the purpose of separating them.

Reference will next be made to FIG. 7 which shows another embodiment of the culture chamber 40 which is less expensive and especially adapted for use with a microscope. The culture chamber 40 includes first and second rectangular micro-coverglasses 41 and 42 with a rectangular silicone-rubber compound gasket 43 therebetween. The gasket is self-bonding to the coverglasses 41 and 42, after being cleansed in acetone in the manner previously described, to thus form a chamber 44 with the contents thereof observable through the coverglasses 41 and 42. The wall of the gasket 443 is provided with a pair of apertures 46 and 47.

In the embodiment of the culture chamber 40, the coverglasses are identically shaped and are preferably standard microcoverglasses of No. 1 to No. 2 thicknesses which are from 0.13 to 0.25 millimeters in thickness. Such standard optical coverglasses are marketed in various sizes and one standard size is 24 × 60 millimeters. In order to provide for fully supporting the thin micro-coverglasses 41 and 42 the outside dimensions of the gasket 43 is made of the same size as these coverglasses. It should be especially noted that by using these thin coverglasses and a gasket 43 of approximately 3/16 inches thick, the gasket is sufficently thick to permit aperture 46 to be of a size to readily receive an 18-gauge hypodermic needle and yet the distance between the underside of the coverglass 41 placed adjacent the objective of the microscope and the other surface of the coverglass 42 nearest the condenser is no greater than the working distance permitted by most student microscopes utilizing ×100 magnification. It should be further noted that the culture chamber 40 in addition to being a culture chamber is especially suited for high-magnification phase-contrast, microscope studies when No. 1 coverglasses are used for oil immersion. Also when lower powers are used, any portion of the flat, top or bottom coverglasses 41 and 42 can be positioned between the objective and the condenser of a microscope for microscopic examination of the contents of the chamber 44 while the contents are still in the chamber. Note that the culture chambers of the present invention allow for the total culture area to be visible with all microscope objectives since both the upper and lower outside surfaces of the culture chamber are planar being composed only of the coverglasses. Furthermore, inasmuch as there is no need for retaining plates to clamp the coverglasses on the gasket there are no strains placed on the coverglasses which are likely to cause optical distortion of the light passing therethrough. The silicone-rubber compound of which the gasket 43 is made is non-wettable, and the apertures 46 and 47 are small enough so that fluid does not leave the chamber 44 easily when the device lies in a flat position for viewing under a microscope. It should also be noted that an aperture 46 need not be provided in the wall of the gasket 43 to receive the hypodermic needle since the material of the gasket is such that the hypodermic needle can readily penetrate the wall thereof. Furthermore, when the needle is withdrawn the material is such that it will close over the opening caused by the penetration. However, such a penetration of the wall of the gasket material by a needle is not recommended since after many such penetrations the structure of the material is damaged and thus limits the length of time the gasket can be used.

Reference will next be made to a flask-type culture chamber 50 shown in FIG. 9 which is formed by self-bonding a first gasket 51 to a first coverglass 52 in a manner previously described and then self-bonding a similarly shaped second gasket 53 to a second coverglass 54. The two gaskets 51 and 53 are then self-bonded together to form the chamber 55. It should be noted that the contact surfaces of the silicone-rubber compound gaskets 51 and 53 will adhere to each other in the same manner which they adhere to the coverglasses when treated in the manner previously described by cleaning with acetone. In the embodiment of the culture chamber shown in FIG. 9, a circular opening 56 is formed by precision molding in the opposing surfaces of the upper walls of the gaskets 51 and 53. As shown in FIG. 9, the inside of surfaces 57 of the upper wall of the gaskets 51 and 52 slope toward the opening 56. A short tube 58 preferably made of glass has its inner end precision fitted and self-bonded in position in the opening 56 with the outer end of the tube extending beyond the edge of the culture chamber 50. A removable stop 59 made of cotton or silicone-rubber compound, for example, is inserted in the end of the tube 58. The tube 58 can be sterilized each time the culture chamber 50 is to be opened to the atmosphere by passing it quickly through a flame to kill bacteria which might otherwise contaminate the culture chamber during the altering of its contents. The flask-type culture chamber structure shown in FIG. 9 is particularly of value when sterile culture work is necessary and the culture must be sampled or altered at routine intervals.

In order to facilitate the opening of the culture chamber 50 shown in FIGS. 9 and 10, shallow, tapered, crevices 61 may be formed at spaced locations about the mating surfaces of the gaskets 51 and 53 to enable a spatula to be inserted therebetween. The culture chamber 63 shown in FIG. 11 is similar to that shown in FIG. 9 in that it is formed of two separate silicone-rubber compound gaskets 64 and 65. Here the outer edges of the thin micro-coverglasses 66 and 67 do not overlap the gasket but are of the same size. Furthermore, in this modification, a corner 68 of one of the gaskets 65 has been cut away to facilitate the separating of the gaskets so as to gain access to the interior of the chamber.

As shown by the culture chamber 69 in FIG. 12, it may be desirable to provide as many as three separate gaskets 70, 71, and 72, each formed of silicone-rubber compound, between the coverglasses 73 and 74 in some applications. Such a structure provides a deeper culture chamber. When used, the bottom portion of the culture chamber 69 is formed on a flat, supporting table by contacting the gasket 70 to the coverglass 74, and then contacting the gsket 71 to the gasket 70. The fluid for the culture chamber 69 can then be placed in the cavity 69a thus formed but the level 75 of the fluid should be well below the upper surface 71a of the gasket 71 so that this surface is dry when the upper gasket 72 is pressed down thereon for bonding. Contacting the upper coverglass 73 on the gasket 72 then completes the fabrication of the culture chamber 69.

The culture chamber 76 shown in FIG. 13 uses a gasket assembly 77 which is formed by self-bonding a first layer or gasket portion 78 of silicone-rubber compound onto one surface of a plastic or glass plate 79 provided with a central opening corresponding to that provided in gasket portion 78. A second layer or gasket portion 80 also formed of silicone-rubber compound is self-bonded to the opposite surface of the plastic plate 79. The gasket portions 78 and 80 are preferably permitted to set on the plastic plate 79 for a period of several days so that the natural bond formed is quite strong. The gasket assembly 77 thus formed is then bonded between a pair of coverglasses 81 and 82. An opening 79a is formed in the wall of plastic plate 79. As shown in FIG. 14, a teflon insert 83 provided with a threaded opening 83a is placed in the opening 79a and bonded in position. A threaded stop 84 can then be used to close off the opening 83a. Alternatively any of a number of different instruments such as a ph probe or other chemical analysis probe can be positioned in the opening 79a. The advantage of constructing a culture chamber as shown in FIG. 13 is that it enables a deep culture chamber to be formed without the need of using a large quantity of silicone-rubber compound gasket material. Moreover, such a construction cuts down on the rate of diffusion of gases through the wall of the gasket. Furthermore, such a construction facilitates the introduction of probes or needles into the chamber and eliminates the concern of possibly overflexing the wall of the gasket by the insertion of such instruments.

It should now be clearly understood that opening the culture chamber of the present invention by soaking its silicone-rubber compound gasket in acetone to loosen the bond is the only manner of effectively separating a singular gasket from its thin, micro-coverglasses. However, this method is not practical when the entire chamber is needed for immediate reuse since one must apply heat or wait for a sufficient time to allow the acetone to evaporate before the gasket is again usable. Furthermore, the method is not practical if it is desired to keep the organisms in the culture alive since soaking the culture chamber in acetone can kill these organisms. Thus, the providing of a culture chamber with two or more gaskets as shown in FIGS. 10, 11, 12, enables the chamber to be opened without the need for soaking it in acetone by effectively "unzipping" the contacting surfaces of the gaskets apart by wedging the end of a blade or spatula into the crevices such as 61 shown in FIG. 10.

In order to open the culture chamber such as culture chamber 63 shown in FIG. 11 provided with a pair of gaskets 64 and 65, the large surfaces of one of the coverglasses 67 is preferably held facing the flat surface of the supporting table. The rounded end of a thin spatula is then manipulated sideways between the pair of gaskets, then around the chamber by pulling the spatula with one's thumb supported against the corner of the culture chamber. Thus, culture chambers with square or rectangularly configured outer walls have an advantage over culture chambers with circular outer walls because the corner walls allow one to gain leverage when moving the spatula parallel to the supporting table. In addition, sharp corners have low surface contact areas making the adjacent corners of two gaskets easy to pry apart such that one can gain a beginning for spatula insertion.

Reference will next be made to a drop-culture chamber 85 shown in FIGS. 15 and 16. Such a culture chamber is formed of a square outwardly-shaped gasket 86 having a circular inner wall 87, and square shaped coverglasses 89 and 90. The coverglasses 89 and 90 are coextensive with the surface of the gasket 86 and are thin enough to enable the top, inner, glass surface of the culture chamber to be positioned under a microscope for large magnification. The culture medium within the circular chamber 91 is in the form of a culture drop 92 suspended from the upper coverglass 89. As illustrated in FIG. 17, such a culture drop can be readily retained within the chamber 91 over a period of time by inverting the culture chamber 85 such that its coverglass 89 with drop 92 adhering thereto is disposed adjacent a disk-like metal conductor 95 which is positioned opposite a cool surface 96. A fluorescent lamp 99, similar to lamp 38 in FIG. 5 is positioned over the culture chamber 85. The temperature differential between the upper coverglass 90 and the lower coverglass 89 serves to maintain the drop 92 against the coverglass 89.

A modified embodiment of a drop-culture chamber 101, shown in FIG. 18, provides for bonding a circular gasket 103 onto a relatively thick, rectangular standard microscope slide 105. A circular, thin, coverglass 107 is bonded to the top of the gasket 103. A culture drop 108 adheres to the innerface of the coverglass 107. Such a construction of a drop-culture chamber is desirable since it facilitates the opening of the culture chamber by inserting of a spatula between the lower surface of gasket 103 and the upper surface of the thick-glass microscope slide 105 while the latter is firmly held against a flat supporting surface.

A still further embodiment 110 of a culture chamber 10 is shown in FIGS. 19 and 20. Here the thin circular upper and lower micro-coverglasses 111 and 112 are bonded on the opposite faces of a thin silicone-rubber compound gasket 113. The coverglasses are sufficiently close together so that a culture drop 115 enclosed therein is wedged so as to contact both inner surfaces thereof.

From the above description it will be apparent that there is thus provided a device of the character described and possessing the particular features of advantage before enumerated as desirable but which obviously is susceptible of modification in its form, proportion, detailed construction, and arrangement of parts without departing from the principle involved or sacrificing any of its advantages.

While in order to comply with the statute, the invention has been described in language more or less specific as to structural features, it is to be understood that the invention is not limited to the specific features shown but that the means and construction herein disclosed comprise the perfered forms of several modes of putting the invention into effect and the invention is, therefore, claimed in any of its forms or modifications within the legitimate and valid scope of the appended claims.

What is claim is:

1. A culture chamber suitable for use in the study of biological systems comprising:
    a first and second thin, fragile coverglass,
    a gasket of silicone-rubber compound having a peripheral wall with smooth, flat, molded, upper and lower surfaces, said gasket having been cleaned with an organic cleansing agent so that the molded upper and lower surfaces thereof have a natural bonding characteristic which strengthens with time, whereby said gasket is fully sandwiched between said first and second coverglasses such that the outer edges of the upper and lower surfaces of said gasket are fully supported by said coverglasses, the molded upper and lower surfaces of the peripheral wall of said gasket adhering to the contacting surfaces of said first and second coverglasses to thereby provide a water-tight chamber defined by the opposing surfaces of said coverglasses and the inner surface of the peripheral wall of said gasket, and wherein the peripheral wall of said gasket is provided with at least one aperture providing access to said chamber and communication with the ambient atmosphere.

2. The invention in accordance with claim 1 wherein said gasket and said coverglasses are rectangularly shaped, and wherein the outer edges of at least one of said coverglasses extend beyond the outer edges of said gasket.

3. The invention in accordance with claim 2 wherein the outer edges of both of said coverglasses extend beyond the outer edges of said gasket, and wherein paraffin is provided in the channel formed about the outer edges of said gasket by the spaced outer edges of said coverglasses.

4. A culture chamber suitable for use in the study of biological systems comprising:

a first and second thin fragile coverglass, a gasket of silicone-rubber compound, said gasket including a plurality of layers of silicone-rubber compound, each said layer having a peripheral wall with smooth flat molded upper and lower surfaces, and each said layer having been cleaned with an organic cleansing agent so that the flat molded upper and lower surfaces thereof have a natural bonding characteristic which strengthens with time, whereby the layers of silicone-rubber compound are stacked together with the flat molded lower surface of a layer pressed against the flat molded upper surface of the adjacent layer to form said gasket and said gasket is fully sandwiched between said first and second coverglasses, the flat molded upper and lower surfaces of the peripheral wall of said gasket adhering to the contacting surfaces of said first and second coverglasses to thereby provide a water-tight chamber defined by the opposing surfaces of said coverglasses and the inner surface of the peripheral wall of said gasket, and wherein the peripheral wall of said gasket is provided with at least one aperture providing access to said chamber and communication with the ambient atmosphere.

5. The invention in accordance with claim 4 wherein at least one crevice is formed along the edge periphery of the contacting surfaces of adjacent layers forming said gasket.

6. A culture chamber suitable for use in the study of biological systems comprising:

a first and second thin fragile coverglass, a gasket of silicone-rubber compound, said gasket including a glass portion sandwiched between a first and second layer of silicone-rubber compound gasket portions, said gasket portions each having a peripheral wall with a smooth flat molded upper and lower surface, and said glass portion having a similarly shaped peripheral wall with flat upper and lower surfaces, said layers of gasket portions having been cleaned with an organic cleansing agent so that the flat molded upper and lower surfaces thereof have a natural bonding characteristic which strengthens with time, whereby said glass portion is sandwiched between said layers of gasket portions and said gasket so formed is fully sandwiched between said first and second coverglasses, the flat molded upper and lower surfaces of the layers of silicone-rubber gasket adhering the contacting surfaces of said glass portion and said first and second coverglasses to thereby provide a water-tight chamber defined by the opposing surfaces of said coverglasses and the inner surfaces of the peripheral walls of the glass portion and gasket portions forming said gasket, and wherein the peripheral wall of said gasket so formed is provided with at least one aperture in the glass portion thereof providing access to said chamber and communication with the ambient atmosphere.

7. A method for the fabrication of a culture chamber suitable for use in the study of biological culture systems which comprises:

providing a gasket of silicone-rubber compound having a peripheral wall with smooth, flat, molded, upper and lower surfaces, forming at least one aperture in the peripheral wall of said gasket, cleaning the flat, molded, upper and lower surfaces of said gakset with an organic cleansing agent, providing a first and second thin, fragile coverglass, cleaning the surfaces of said first and second coverglasses with said organic cleansing agent, sandwiching said gasket between said first and second coverglasses, said gasket being of such a size that when so sandwiched between said first and second coverglasses the outer edges of the upper and lower surfaces of said gasket are fully supported by said coverglasses, pressing with moderate finger pressure the surface of said first and second coverglasses against the respective flat, molded, upper and lower surfaces of said gasket to form a continuous area of contact therebetween to thereby provide a liquid-tight chamber defined by the opposing surfaces of said first and second coverglasses and the inner surfaces of the peripheral wall of said gasket, and permitting the continuous areas of contact of said first and second coverglasses and said gasket to remain in contact for a period of approximately two days to thereby form a strong bond between said gasket and said first and second coverglasses.

8. The method in accordance with claim 7 including the steps of:

initially soaking said gasket in said organic cleansing agent for a period of approximately a day; and permitting said organic cleansing agent to evaporate from said gasket prior to pressing said first and second coverglasses on the upper and lower surfaces thereof.

9. The invention in accordance with claim 7 wherein said organic cleansing agent is acetone.

10. The invention in accordance with claim 7 including the step of opening said culture chamber after it has been fabricated by soaking it in said organic cleansing agent to loosen the strong natural bond formed between said gasket and said coverglasses.

11. A method for the fabrication of a culture chamber suitable for use in the study of biological culture systems which comprises:

providing a gasket of silicone-rubber compound, said gasket including two layers of silicone rubber compound gasket portions, each said layer having a peripheral wall with smooth flat molded upper and lower surfaces, cleaning the flat molded upper and lower surfaces of each of said layers of gasket portions with an organic cleansing agent, pressing with moderate finger pressure the lower flat molded surface of one of said layers of gasket portions against the upper flat molded surface of the other of said layers of gasket portions to form said gasket, forming at least one aperture in the peripheral wall of said gasket, providing a first and second thin fragile coverglass, cleaning the surfaces of said first and second coverglasses with said organic cleansing agent, pressing with moderate finger pressure the surfaces of said first and second coverglasses against the respective flat upper and lower surfaces of said gasket to form a continuous area of contact therebetween to thereby provide a liquid-tight chamber defined by the opposing surfaces of said first and second coverglasses and the inner surface of the peripheral wall of said gasket, and permitting the continuous area of contact of said first and second coverglasses and said gasket to remain in contact for a period of approximately two days to thereby form a strong bond between said gasket and said first and second coverglasses.

* * * * *